US00RE42926E

(19) United States
(12) Reissued Patent
Norwood et al.

(10) Patent Number: US RE42,926 E
(45) Date of Reissued Patent: Nov. 15, 2011

(54) MINIATURE BNC CONNECTOR

(75) Inventors: Joe D. Norwood, Fountain Hills, AZ (US); Anthony Hidalgo, Simi Valley, CA (US)

(73) Assignee: Trompeter Electronics, Inc., Mesa, AZ (US)

(21) Appl. No.: 12/209,045

(22) Filed: Sep. 11, 2008

Related U.S. Patent Documents

Reissue of:

(64) Patent No.: 7,104,826
Issued: Sep. 12, 2006
Appl. No.: 10/914,280
Filed: Aug. 10, 2004

U.S. Applications:

(63) Continuation of application No. 10/436,351, filed on May 13, 2003, now Pat. No. 6,921,283, which is a continuation-in-part of application No. 09/938,857, filed on Aug. 27, 2001, now Pat. No. 6,561,841, and a continuation-in-part of application No. 10/038,581, filed on Jan. 8, 2002, now abandoned.

(51) Int. Cl.
*H01R 4/54* (2006.01)
*H01R 13/52* (2006.01)

(52) U.S. Cl. ..... 439/314; 439/318; 439/315

(58) Field of Classification Search ..... 439/311, 439/314, 316, 318, 332, 489, 286, 490, 333, 439/578, 315, 312
See application file for complete search history.

(56) References Cited

U.S. PATENT DOCUMENTS

| | | | | |
|---|---|---|---|---|
| 3,609,632 | A | 9/1971 | Vetter | |
| 3,708,781 | A | 1/1973 | Trompeter | |
| 3,790,915 | A | 2/1974 | Dugan et al. | |
| 4,037,909 | A | 7/1977 | Trompeter et al. | |
| 4,290,662 | A | 9/1981 | Storcel | |
| 4,462,653 | A | 7/1984 | Flederbach et al. | |
| 4,674,809 | A | 6/1987 | Hollyday et al. | |
| 4,702,537 | A | 10/1987 | Mattingly et al. | |
| 4,702,539 | A | 10/1987 | Cusick | |
| 4,703,988 | A | 11/1987 | Raux et al. | |
| 4,781,619 | A * | 11/1988 | Ikeda | 439/488 |
| 5,067,909 | A | 11/1991 | Behning | |
| 5,280,254 | A | 1/1994 | Hunter et al. | |
| 5,382,173 | A | 1/1995 | Brown et al. | |

(Continued)

FOREIGN PATENT DOCUMENTS

EP 0 367 432 5/1990

(Continued)

OTHER PUBLICATIONS

*BNC Connectors*, at http://www.bomarinterconnect.com/mini-bnc_connectors.htm, 2 pages, printed Jun. 15, 2005.

(Continued)

*Primary Examiner* — Briggitte R Hammond
(74) *Attorney, Agent, or Firm* — SNR Denton US LLP; Brian R. McGinley

(57) ABSTRACT

A miniature BNC connector assembly having reduced dimensions includes a plug-side connector configured for engagement with a jack-side connector to form an electrical connection. The plug-side connector includes a plug-side connector body and a bayonet sleeve rotatably connected to the connector body. The bayonet sleeve has an outer diameter not greater than approximately half an inch.

21 Claims, 6 Drawing Sheets

U.S. PATENT DOCUMENTS

| | | | | |
|---|---|---|---|---|
| 5,409,398 | A | 4/1995 | Chadbourne et al. | |
| 5,417,588 | A * | 5/1995 | Olson et al. | 439/585 |
| 5,430,615 | A * | 7/1995 | Keeth et al. | 439/65 |
| 5,490,033 | A | 2/1996 | Cronin | |
| 5,547,395 | A | 8/1996 | Delamotte | |
| 5,558,538 | A | 9/1996 | Delalle | |
| 5,662,488 | A | 9/1997 | Alden | |
| 5,695,365 | A | 12/1997 | Kennedy et al. | |
| 5,702,262 | A | 12/1997 | Brown et al. | |
| 5,860,833 | A | 1/1999 | Chillscyzn et al. | |
| 5,897,384 | A | 4/1999 | Hosler, Sr. | |
| 6,045,378 | A | 4/2000 | Follingstad | |
| 6,106,314 | A | 8/2000 | McLean et al. | |
| 6,226,068 | B1 | 5/2001 | Arcykiewicz et al. | |
| 6,309,246 | B1 | 10/2001 | Keaton | |
| 6,390,825 | B1 | 5/2002 | Handley et al. | |
| 6,468,100 | B1 | 10/2002 | Meyer | |
| 6,561,841 | B2 | 5/2003 | Norwood et al. | |
| 6,679,728 | B1 | 1/2004 | Huang et al. | |
| 6,780,051 | B2 | 8/2004 | Otsu | |
| 6,805,583 | B2 | 10/2004 | Holliday | |
| 7,163,405 | B2 | 1/2007 | Geil | |
| 7,354,289 | B2 | 4/2008 | Cannon | |
| 7,381,089 | B2 | 6/2008 | Hosler, Sr. | |
| 7,497,729 | B1 | 3/2009 | Wei | |
| 2003/0129870 | A1 | 7/2003 | Norwood et al. | |
| 2004/0033711 | A1 | 2/2004 | Loveless | |
| 2004/0038584 | A1 | 2/2004 | Zahlit et al. | |
| 2004/0203283 | A1 | 10/2004 | Chen et al. | |
| 2009/0017705 | A1 | 1/2009 | Petersen | |

FOREIGN PATENT DOCUMENTS

| | | |
|---|---|---|
| EP | 0 379 192 | 7/1990 |
| EP | 0 387 026 | 9/1990 |
| EP | 0 396 202 | 11/1990 |
| GB | 2 224 356 | 5/1990 |
| GB | 2 229 005 | 9/1990 |
| GB | 2 230 156 | 10/1990 |
| GB | 2 313 207 | 11/1997 |
| WO | WO 00/576681 | 9/2000 |
| WO | WO 01/73461 | 10/2001 |
| WO | WO 02/056427 | 7/2002 |
| WO | WO 02/073223 | 9/2002 |
| WO | WO 01/073461 | 10/2002 |
| WO | WO 03/065385 | 8/2003 |

OTHER PUBLICATIONS

*The Edge,* Issue No. 037, 4 pages, Feb. 15, 2005.

Fakhry, L., "Miniature BNC Jack Delivers Carrier Class Reliability," *Electronic Design,* ED Online #2908, at http://www.elecdesign.com/Articles/Index.cfm?AD=1&ArticleID=2908, 3 pages, Mar. 3, 2003.

*Mini BNC; 75 Ohm Miniature BNC Series,* Tyco Electronics Incorporated, 5 pages, May 2004.

*Mini BNC Connectors,* at http://catalog.tycoelectronics.com, 5 pages, printed Jul. 14, 2005.

*Miniature 50 Ohm BNC Round Socket,* at http://rswww.com, 1 page, Arp. 2005.

*Miniature BNC Boosts Density;* at http://www.eepn.com, 3 pages, Mar. 2003.

*New 90* PCB-mount miniature BNC,* at http://www.pmk.com/fsproducts.htm, 1 page, May 2002.

*New Products,* at http://www.cedmagazine.com/ced/2002/0502/05np.htm, 7 pages, May 2002.

*Product Information—RS Stock No. 455-703,* at http://rswww.com, 1 page, printed Jun. 15, 2005.

Reed, D., "High-reliability BNC Connector Design," *Connector Specifier,* pp. 12-14, Sep. 2001.

*RF connector increases interconnect density,* at http://ridesign.com/products/RF—connector -interconnect/, 2 pages, Jul. 15, 2004.

Roos, G., "Mini BNC joins RF connector family," at http://eeproductcenter.com, 1 page, Apr. 28, 2004.

Roos, G., "RF connectors tackle higher density, higher frequency and miniaturization," at http://eeproductcenter.com, 7 pages, Jul. 26, 2004.

*SlimLine BNC connector series,* Amphanol RF, at http://amphenolf.com/products/slimlinebnc.asp, 3 pages, Copyright 2003-2005.

*V-Bite® PC Edge Mount,* at http://bomarinterconnect.com/v-bite.htm, 2 pages, printed Jul. 14, 2005.

*Video Assemblies: BNC, Micro-miniature,* at http://www.btx.com, 5 pages, Copyright 2005.

*PL 155 Specification Sheet: Drawing No. 310-0036,* Trompeter Electronics, Inc., 2 pages, Jun. 20, 1975.

*CJ150 Specification Sheet: Drawing No. 3-0025,* Trompeter Electronics, Inc., 2 pages, Jun. 20, 1975.

*TCS-CJ150AC/FL Specification Sheet: Drawing No. TCS-CJ150AC/FL,* Trompeter Electronics, Inc., 6, pages, Jun. 6, 1988.

*TCS-PL155/FL Specification Sheet: Drawing No. TCS-PL155/FL,* Trompeter Electronics, Inc., 5 pages, Nov. 13, 1979.

*BJ50 Specification Sheet: Drawing No. 1000-0403,* Trompeter Electronics, Inc., 2 pages, Sep. 11, 1973.

*PL50 Specification Sheet: Drawing No. 1-0016,* Trompeter Electronics, Inc., 2 pages, Aug. 5, 1966.

*PLUG ASSY UPL250 Specification Sheet: Drawing No. 1-0592,* Trompeter Electronics, Inc., 1 page, Oct. 20, 2004.

*UBJ250 Specification Sheet: Drawing No. 1-0593,* Trompeter Electronics, Inc., 1 page, Mar. 21, 2002.

*75 ohm M-BNC Plug Specification: TCS-UPL250,* Revision B (ECO#15746), Trompeter Electronics, Inc., 12 pages, Jan. 11, 2005.

*TCS-UJ250 Specification Sheet: Drawing No. UCBJ250SPEC,* Trompeter Electronics, Inc., 1 page, Mar. 3, 2003.

*Mini BNC connectors,* 1 page.

*75 ohm BNC Plug Specification: TCS-UPL220,* Revision C (ECO#15162), Trompeter Electronics, Inc., 13 pages, Oct. 27, 2003.

*75 OHM BNC Interface Specification Sheet: Drawing No. TGS-5,* Trompeter Electronics, Inc., 1 page, Oct. 19, 1987.

*TAI-125 Specification Sheet: Drawing No. TAI-125,* Trompeter Electronics, Inc., 1 page, May 6, 1983.

*TAI-D118 Specification Sheet: Drawing No. TAI-D118,* Trompeter Electronics, Inc., 1 page, Apr. 9, 1980.

* cited by examiner

MINIATURE BNC CONNECTOR

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation of U.S. application Ser. No. 10/436,351, filed May 13, 2003 now U.S. Pat No. 6,921,283 (that published as U.S. Pub. Pat. App. No. 2004-0038584-A1 on Feb. 26, 2004), which is incorporated by reference herein in its entirety.

U.S. application Ser. No. 10/436,351 is a continuation-in-part of U.S. application Ser. No. 09/938,857 filed Aug. 27, 2001 (that issued as U.S. Pat. No. 6,561,841 on May 13, 2002), which is incorporated by reference herein in its entirety.

U.S. application Ser. No. 10/436,351 is also a continuation-in-part of U.S. application Ser. No. 10/038,581, filed Jan. 8, 2002 (that published as U.S. Pub. Pat. application No. 2003-0129870-A1 on Jul. 10, 2003, now abandoned), which is incorporated by reference herein in its entirety.

BACKGROUND OF THE INVENTION

1. Field of the Invention

The present invention relates generally to the field of electrical connectors. In particular, the present invention relates to coaxial RF connectors.

2. Background Art

Electrical connectors provide couplings between electronic elements and/or devices. Many different types of electrical connectors exist and have been used to provide removable electrical connections between electronic elements and devices. On such type is RF (radio frequency) connectors.

Bayonet mechanisms are one way of securing such removable RF electrical connectors. One type of removable or separable electrical connector having a bayonet mechanism is known as a BNC or Bayonet Neil-Concelman mating connector pair. BNC mating connector pairs facilitate attachment of coaxial electrical cables to electronic elements or devices. Typical BNC mating connector pairs include a jack-side connector mounted to an electronic device or element and a plug-side connector connected to a cable. The jack-side connector typically includes a tubular cylindrical housing and a socket formed in a central location of the housing. The plug-side connector typically includes a tubular cylindrical connector body having a central contact formed in a central location of the connector body. The central contact of the plug-side connector is inserted into the socket of the jack-side connector and the connector body of the plug-side connector is inserted into the housing of the jack-side connector.

The jack-side connector also includes outwardly extending lugs formed on the outer surface of the housing. The plug-side connector includes a bayonet sleeve rotatably mounted on the outer surface of the connector body. The bayonet sleeve includes slots, which are typically J-shaped (J-slots), to mate with the lugs on the jack-side connector. The J-slots include an initial portion and a terminal portion. To connect the BNC mating connector pair, the slots in the bayonet sleeve first receive the lugs into the initial portion of the J-shaped slots, such that the mating connector pair is in a position of partial engagement. The bayonet sleeve is then rotated relative to the jack-side connector until the lugs slide into the terminal portion of the J-shaped slots. The mating connector pair is now in a fully engaged position, where the lugs are held and locked into the terminal portion of the J-shaped slots.

U.S. Pat. No. 4,037,909 to Trompeter et al. and U.S. Pat. No. 3,708,781 to Trompeter, which are herein incorporated by reference in their entirety, each disclose full-size BNC mating connector pairs. Further, BNC mating connector pairs are commercially available from Trompeter Electronics, Inc., Westlake Village, Calif. A common use of the Trompeter 75 ohm BNC mating connector pair is for telephone company central office DS3 applications. Full-size BNC mating connector pairs also see high volume use in the broadcast industry for providing high bandwidth connections between television broadcast equipment.

The twist-lock connection of the bayonet mechanism is a central feature of BNC connector pairs, and provides a convenient and reliable means for electrically connecting various electronic elements and devices. BNC connector pairs allow a reliable electrical connection to be made without the danger of the jack-side and plug-side connectors gradually working loose or becoming inadvertently unplugged.

The bayonet mechanism of BNC mating connector pairs provides a positive engagement between jack-side connectors and plug-side connectors. This positive engagement allows a user to determine whether a jack-side connector is fully engaged with a plug-side connector by attempting to manually rotate the bayonet sleeve (e.g., using his or her fingers). If substantial resistance is encountered, then the mating connector pair is fully engaged.

Large numbers of full-size BNC mating connector pairs are often positioned in close proximity (both vertically and horizontally) on network elements. Increased market demand for telephone lines (for voice, fax and data traffic) has caused additional crowding in telephone company central offices. It is desired to increase the density of connections on, for example, digital cross connect modules. However, the mechanical footprint of the standard BNC connector hinders further increases in connection densities.

Connectors, such as the SMB connector, with smaller footprints might be used, but they lack certain advantages (e.g., the bayonet locking feature and field crimpability) of BNC connectors, which have become an industry standard. Therefore, the present inventors have recognized that, what is needed, is a connector having the advantages of the BNC connector but having a smaller footprint to allow an increase in connector population density on, for example, network elements such as an OC-48 multiplexer or a DSX (digital cross connect).

Another problem that occurs when multiple mating connector pairs are positioned in close proximity is that it is often not possible for a user to look at the mating connector pairs from a viewpoint that allows visual inspection of the relative positioning between the lug and the J-shaped slot to confirm full engagement. Consequently, it is often difficult to manually determine whether a jack-side connector is fully engaged with a corresponding plug-side connector.

Thus, a need also exists for an improved mating connector pair that provides visual indication of the engagement position of the plug-side connector relative to the jack-side connector when the plug-side connector is fully engaged with the jack-side connector.

BRIEF SUMMARY OF THE INVENTION

The present invention is drawn to a plug-side connector and a jack-side connector in a mating connector pair, where the plug-side connector is configured for engagement with the jack-side connector to form an electrical connection, along with an electromagnetic field. The plug-side connector includes a plug-side connector body and a bayonet sleeve rotatably connected to the connector body. The bayonet sleeve has an outer diameter of approximately 0.5 inches or less.

The connector assembly of the present invention is smaller and more compact than previous connector assemblies, particularly full-size BNC mating connector pairs. The connector assembly of the present invention achieves an improvement of approximately 30 percent more interconnects per given area than full-size BNC mating connector pairs, while including all of the attributes of the standard full-size BNC connector, including the same reliability, materials, mechanical stability, 75 ohm impedance and return loss attributes. Further, the connector assembly of the present invention maintains the same tooling and installation processes and can be field-terminated using the same industry-standard cable strip tools, contact crimp tools, crimp sleeve crimp tools and termination practices as the full-size BNC connectors.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The foregoing and other features and advantages of the present invention will be apparent from the following, more particular description of a preferred embodiment of the invention, as illustrated in the accompanying drawings in which.

Figure 7:
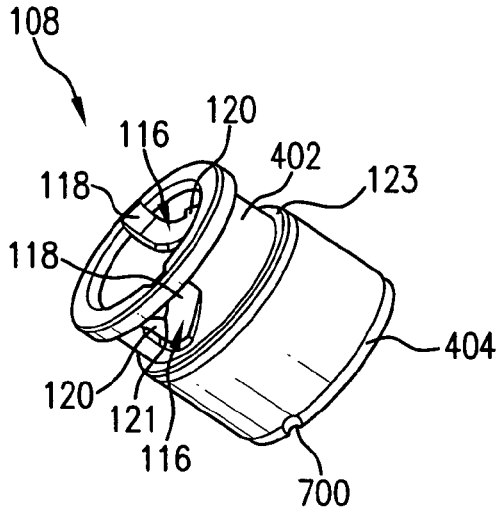
Figure 8:
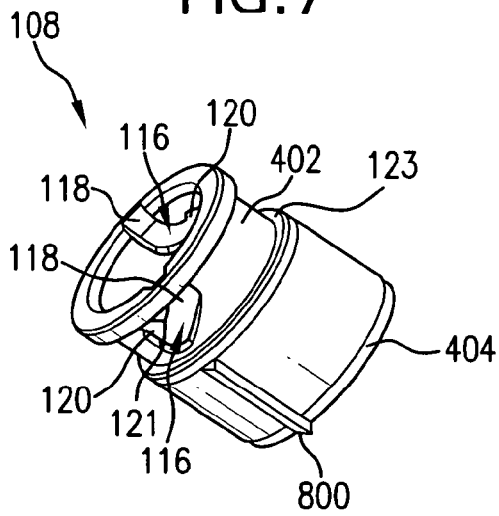
Figure 9:
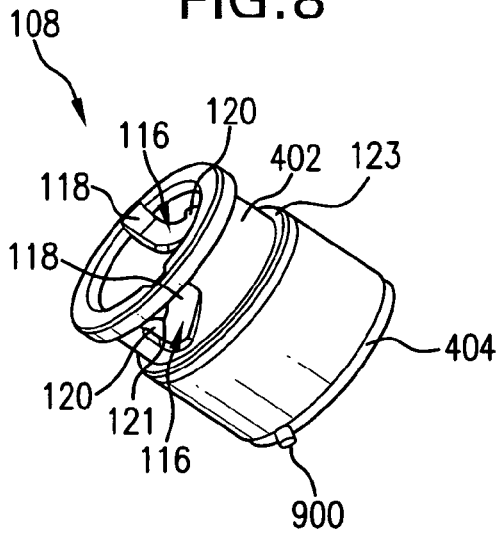

FIGS. 7, 8, and 9 are perspective views of a bayonet sleeve of a plug-side connector illustrating additional embodiments of the indicator of the invention.

A preferred embodiment of the present invention is now described with reference to the Figures, in which like reference numerals can be used to indicate identical or functionally similar elements. Also in the Figures, the left most digit of each reference numeral may correspond to the Figure in which the reference numeral is first used.

DETAILED DESCRIPTION OF THE INVENTION

Overview

While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

When working in tight areas, it is sometimes hard to determine if a plug and jack-side of a connector are fully mated or engaged. Embodiments of the present invention provide a jack-side connector having a first securing device and a plug-side connector having a sleeve rotatably coupled thereto. The sleeve has a second securing device that is complementary to the first securing device and an indicator located on an edge of the sleeve. The indicator is contrasted against a characteristic (e.g., color, material, etc.) of a portion (e.g., a washer) of the connector system to provide visual indication that the first securing device is securely engaged with the second securing device.

Miniature-BNC Assembly

Figure 1:
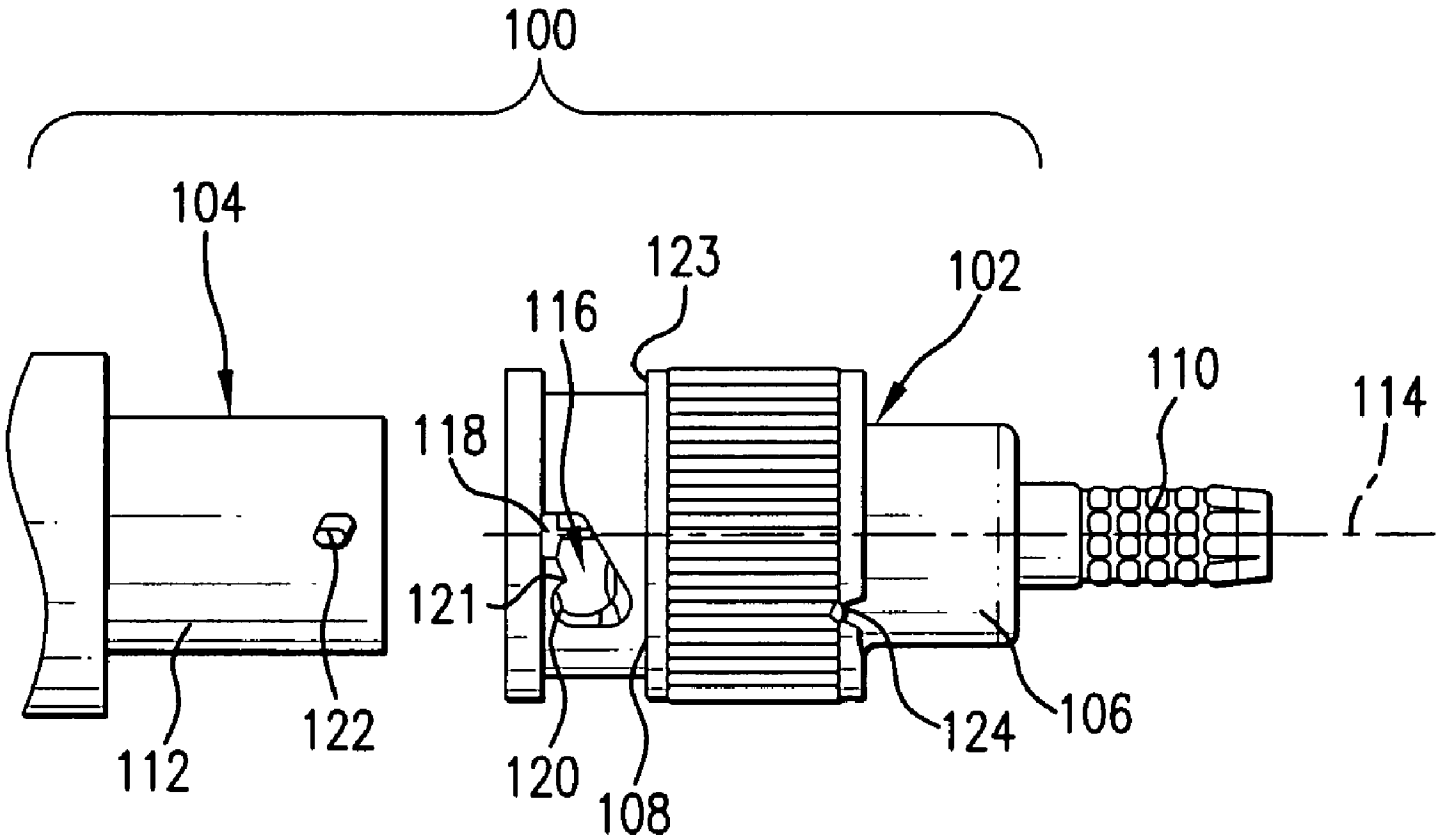
FIG. 1 is a top or side view of the mating connector pair of the present invention, including a jack-side connector and a plug-side connector.

Miniature-BNC (M-BNC) mating connector pair 100 is shown in FIG. 1. M-BNC mating connector pairs are smaller than traditional full-size BNC mating connector pairs while still able to deliver the necessary impedance through a reliable and durable connection. In a preferred embodiment, mating connector pair 100 is a coaxial M-BNC mating connector pair having an impedance of approximately 75 ohms.

M-BNC mating connector pair 100 includes a plug-side connector 102 and a jack-side connector 104. Plug-side connector 102 is configured for engagement with jack-side connector 104 to form an electrical connection.

As shown in FIG. 1, the plug-side connector 102 includes a plug-side connector body 106, a bayonet sleeve 108, and a ferrule 110. Plug-side connector body 106 is configured for mating with a jack-side connector body 112 of jack-side connector 104 along a longitudinal axis 114. Bayonet sleeve 108 is rotatably mounted on plug-side connector body 106, and includes at least one slot 116 (i.e., a securing device), which is preferably J-shaped as shown in FIG. 1. The J-shaped slot (J-slot) 116 includes an initial portion 118 and a terminal portion 120. Slot 116 is configured and arranged for engagement with a lug 122 (i.e., a securing device) of jack-side connector body 112.

Jack-side connector 104 includes jack-side connector body 112 with lug 122 disposed on a peripheral surface of jack-side connector body 112. Jack-side connector 104 is inserted into plug-side connector 102 so that lug 122 is inserted into initial portion 118 of slot 116. Bayonet sleeve 108 is then rotated until plug-side connector 102 and jack-side connector 104 are fully engaged such that lug 122 rests in terminal portion 120 of slot 116.

Bayonet sleeve 108 further includes an indicator 124 located on bayonet sleeve 108. Indicator 124 aligns with lug 122 of jack-side connector body 112 when slot 116 of bayonet sleeve 108 is fully engaged with lug 122 (i.e., when lug 122 rests in terminal portion 120 of slot 116) to provide a visual indication of the secure connection.

Jack-side connector 104, plug-side connector body 106 and bayonet sleeve 108 are more fully described with reference to FIGS. 2, 3 and 4.

Figure 2:
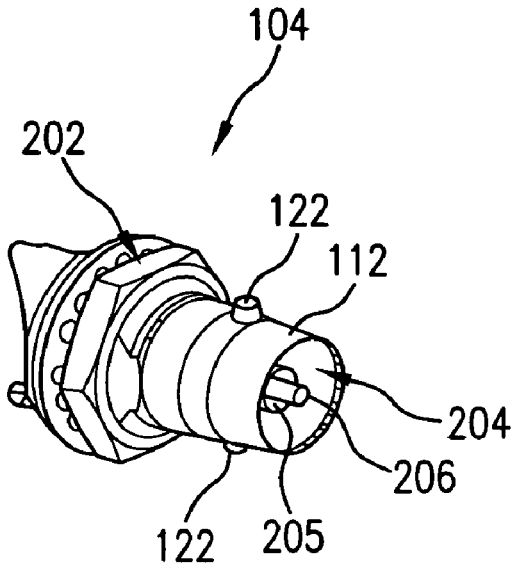
FIG. 2 is a perspective front view of a jack-side connector in accordance with the present invention.

FIG. 2 is a perspective front view of an M-BNC jack-side connector 104. Jack-side connector 104 includes a jack-side connector housing 202, jack-side connector body 112, a lumen 204, a jack-side conductor 206, a jack-side connector insulator 205, and lugs 122. Jack-side connector body 112 is preferably tubular and cylindrical and formed of a conductive material such as aluminum, beryllium copper, brass, zinc or stainless steel. In one embodiment, jack-side connector body 112 has an outer diameter between approximately 0.285 inches and approximately 0.305 inches, and further has an inner diameter that tapers between approximately 0.237 inches and approximately 0.257 inches. In a preferred embodiment, jack-side connector body 112 has an outer diameter of approximately 0.295 inches and an inner diameter of approximately 0.247 inches.

Lugs 122 are disposed on a peripheral surface of jack-side connector body 112. Lugs 122 are preferably cylindrical in shape and extend radially outward from the peripheral surface of jack-side connector body 112. In a preferred embodiment, jack-side connector 104 includes two lugs 122 positioned on jack-side connector body 112 approximately one hundred eighty degrees apart from one another. In an embodiment, the distance between the outermost surfaces of lugs 122 is between approximately 0.345 inches and 0.365 inches. In a preferred embodiment, the distance between the outermost surfaces of lugs 122 is approximately 0.355 inches. In one embodiment, lugs 122 have a diameter of between approximately 0.053 inches and 0.057 inches. In one embodiment, lugs 122 are located between approximately 0.195 inches to approximately 0.201 inches from a front edge of jack-side connector body 112.

Lumen 204 extends longitudinally through jack-side connector body 112. Jack-side conductor 206 is disposed within lumen 204, and is configured to mate with a plug-side conductor 302 (discussed below) of plug-side connector 102 to form an electrical connection. In an embodiment, jack-side conductor 206 is a female socket having an inner diameter between approximately 0.026 inches and approximately 0.032 inches. In a preferred embodiment, the female socket has an inner diameter of approximately 0.029 inches. In one embodiments, jack-side conductor 206 has an outside diameter between approximately 0.052 inches and approximately 0.058 inches and a length of approximately 0.157 inches.

A jack-side connector insulator 205 is preferably provided within lumen 204 and around jack-side conductor 206 to electrically isolate jack-side conductor 206 from jack-side connector body 112. In a preferred embodiment, the jack-side connector insulator 205 is formed of polytetrafluoroethylene (PTFE) and/or tetrafluoroethylene (TFE) and has an outer diameter between approximately 0.189 inches and 0.195 inches, and preferably 0.192 inches. It is to be appreciated, jack-side connector insulator can be formed of other known materials. In one embodiments, a depth of lumen 204 is between approximately 0.177 inches and approximately 0.183 inches.

Figure 3A:
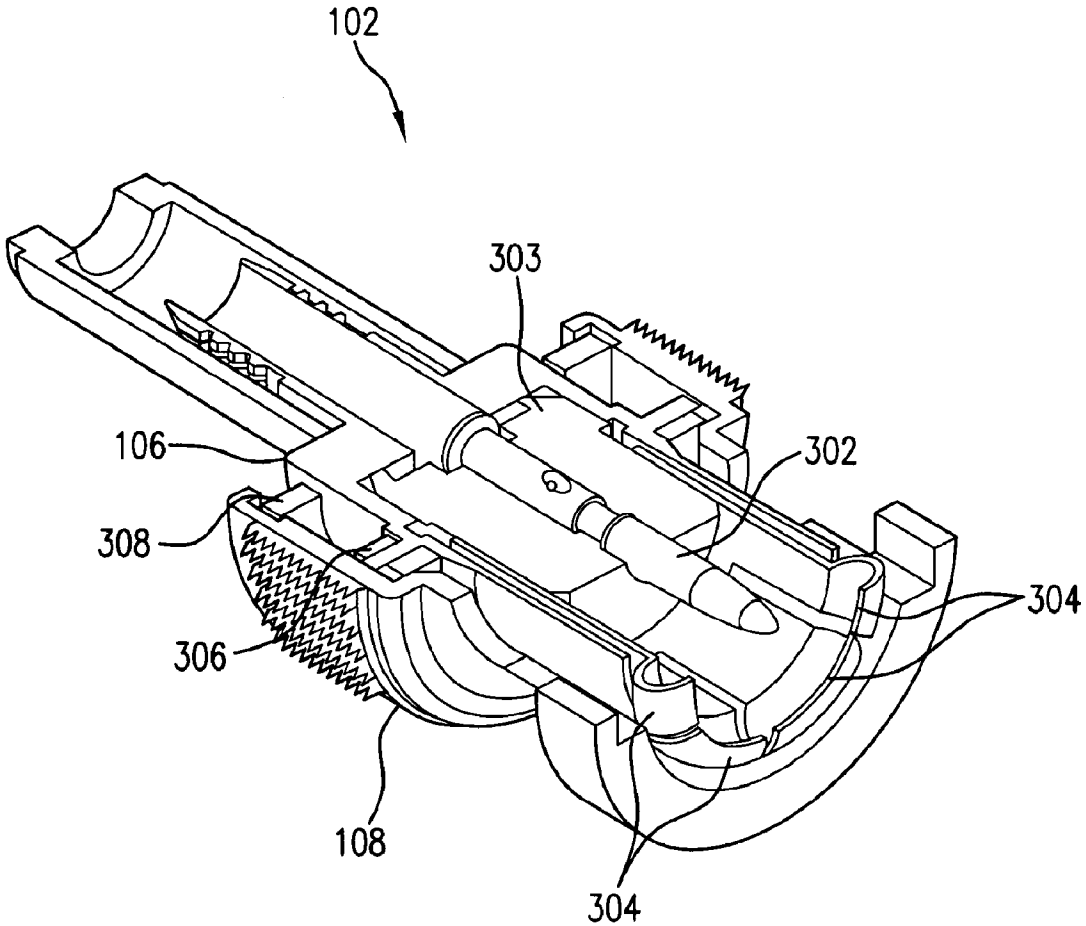
FIG. 3A is a cut-away perspective front view of a plug-side connector in accordance with the present invention.
Figure 3B:
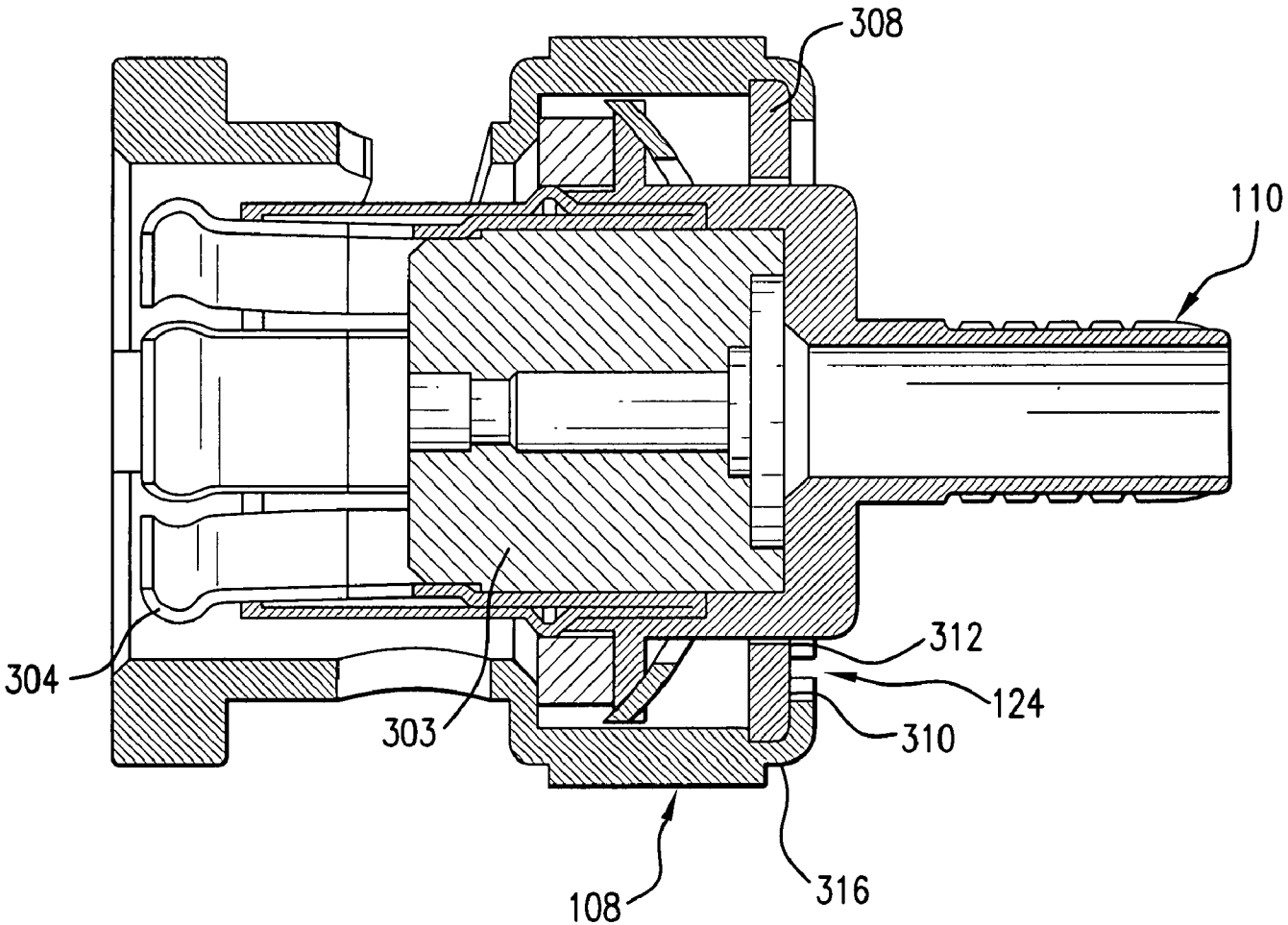
FIG. 3B is a cross-sectional view of a plug-side connector in accordance with the present invention.

FIGS. 3A and 3B are a cut-away perspective front view and a cross-section view of an M-BNC plug-side connector 102, including bayonet sleeve 108 and plug-side connector body 106. Plug-side connector body 106 is preferably tubular and cylindrical and formed of a conductive material such as aluminum, beryllium copper, brass, zinc or steel. Plug-side connector body 106 includes spring fingers 304, a plug-side conductor 302, and a plug-side connector insulator 303. Spring fingers 304 act to bias plug-side connector body 106 into engagement within jack-side connector body 112.

In an embodiment, plug-side connector body 106 has an average inside diameter between approximately 0.180 inches and approximately 0.195 inches. In a preferred embodiment, plug-side connector body 106 has an average inside diameter between approximately 0.183 inches and approximately 0.191 inches.

In an embodiment, spring fingers 304 have an outside diameter of between approximately 0.253 inches and approximately 0.259 inches.

Plug-side conductor 302 is configured to mate with jack-side conductor 206. In an embodiment, plug-side conductor 302 is a male contact which mates with female socket 206 of jack-side connector 104, where the male contact has an outer diameter between approximately 0.026 inches and approximately 0.032 inches. In a preferred embodiment, the male contact has an outer diameter of approximately 0.029 inches. Plug-side connector insulator 303 is preferably provided around plug-side conductor 302 to electrically isolate plug-side conductor 302. In a preferred embodiment, plug-side connector insulator 303 is formed of PTFE or TFE and has an outer diameter between approximately 0.157 inches and approximately 0.163 inches, and preferably approximately 0.160 inches. In one embodiment, a distance from a front surface 306 of plug-side connector insulator 303 to an end 308 of spring fingers 304 is between approximately 0.180 inches and approximately 0.200 inches. In one embodiment, a distance from end 308 of plug-side conductor 302 and an end 310 of spring fingers 304 is between approximately 0.035 inches and 0.055 inches.

In an alternate embodiment, plug-side conductor 302 and jack-side conductor 206 may be reversed so that plug-side conductor 302 is a female socket, and jack-side conductor 206 is a male contact. In a preferred embodiment, plug-side connector body 106 mates with jack-side connector body 112 such that spring fingers 304 fit within lumen 204 and plug-side conductor 302 mates with jack-side conductor 206 to form an electrical connection. Bayonet sleeve 108 is discussed in greater detail below with reference to FIG. 4.

Figure 4:
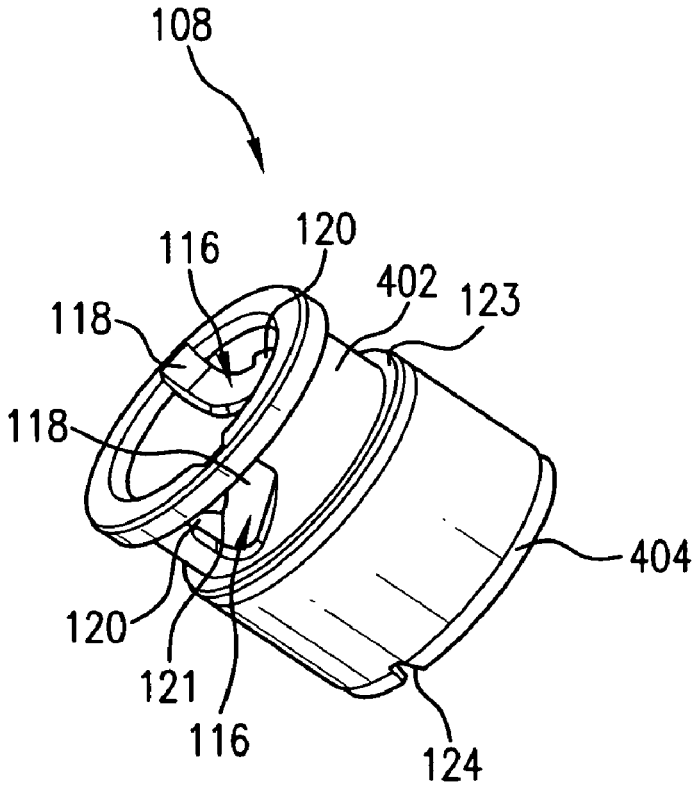
FIG. 4 is a perspective view of a bayonet sleeve of a plug-side connector in accordance with the present invention.

FIG. 4 is a perspective view of an M-BNC bayonet sleeve 108.

Bayonet sleeve 108 is configured to be rotatably mounted on plug-side connector body 106, and includes a recessed portion 402, slots 116 and an indicator 124, which is discussed in more detail below with reference to FIGS. 3A, 3B, and 7-10. Sleeve 108 is preferably tubular and cylindrical and formed of a conductive material such as aluminum, beryllium copper, brass, zinc or stainless steel.

In one embodiment, bayonet sleeve 108 has an outer diameter not greater than approximately 0.5 inches, preferably between approximately 0.425 inches and approximately 0.484 inches. In a preferred embodiment, bayonet sleeve has an outer diameter between approximately 0.430 inches and approximately 0.445 inches, and preferably approximately 0.437 inches.

Bayonet sleeve has an inner diameter between approximately 0.300 inches and approximately 0.310 inches. In a preferred embodiment, bayonet sleeve has an inner diameter between approximately 0.303 inches and approximately 0.307 inches, and preferably approximately 0.305 inches.

Slots 116 are configured and arranged for engagement with lugs 122 of jack-side connector 104. In a preferred embodiment, sleeve 108 includes two slots 116 positioned on recessed portion 402 approximately one hundred eighty degrees apart from one another, corresponding to two lugs 122 positioned approximately one hundred eighty degrees apart from one another on jack-side connector body 112 (see FIG. 2). As shown in FIG. 4, slots 116 are substantially J-shaped. Although J-shaped slots are shown, in alternate embodiments, slots may be any type of suitable shape, as would be apparent to one skilled in the relevant art. J-shaped slots 116 include initial portions 118 and terminal portions 120 with a detent 121 therebetween, as shown in FIG. 4.

As discussed above, slots 116 are configured and arranged to correspond and engage with lugs 122.

In one embodiment, a width of J-shaped slots 116 is between approximately 0.061 inches and approximately 0.067 inches. In one embodiment, a distance from terminal portion 120 to a front edge 123 of bayonet sleeve 108 is between approximately 0.051 inches and approximately 0.061 inches. In one embodiment, a distance from a highest point of detent 121 and front edge 123 of bayonet sleeve 108 is between approximately 0.071 inches to approximately 0.081 inches. In one embodiment, a distance from an upper most edge 125 of J-shaped slots 116 to front edge 123 of bayonet sleeve 108, is between approximately 0.155 inches to approximately 0.161 inches.

Mating or Engagement of Plug and Jack-Side Connectors

The mating and engagement of jack-side connector 104 and lugs 122 to plug-side connector 102 and slots 116 is further discussed with reference to FIGS. 5 and 6.

Figure 5:
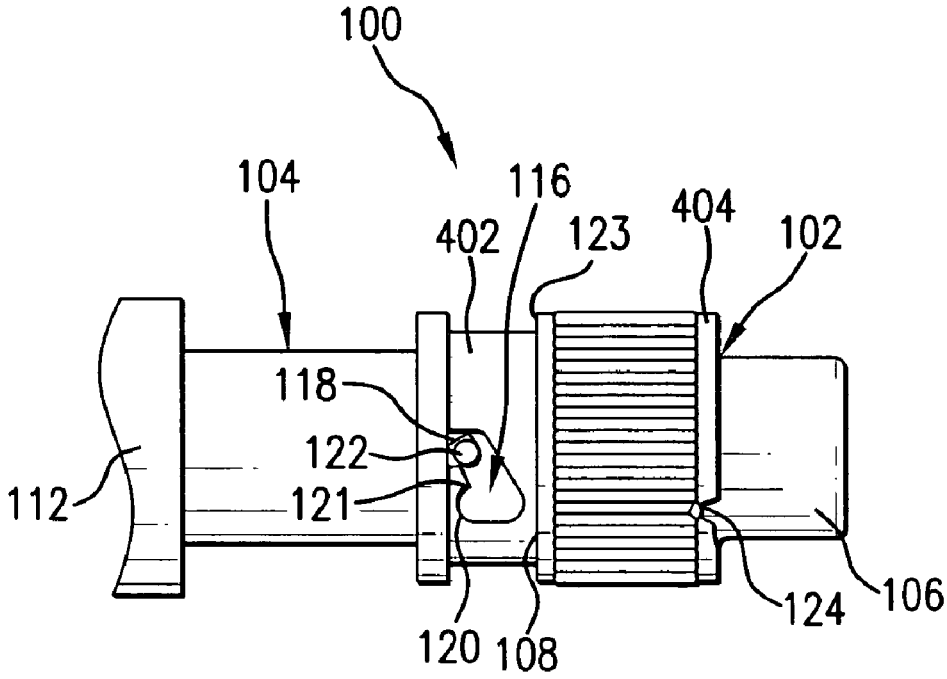
FIG. 5 is a top or side view of the mating connector pair of the present invention depicting the plug-side connector in partial engagement with the jack-side connector, wherein the lugs of the jack-side connector are positioned in the initial portion of the slots of the plug-side connector in accordance with the present invention.
Figure 6:
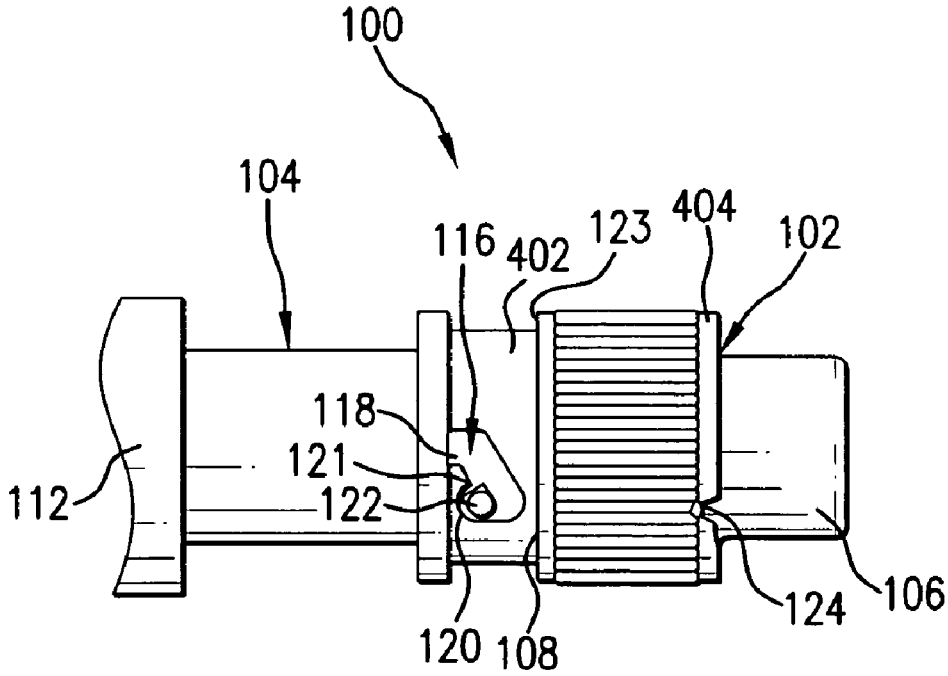
FIG. 6 is a top or side view of the mating connector pair of the present invention depicting the plug-side connector in full engagement with the jack-side connector, wherein the lugs of the jack-side connector are positioned in the terminal portion of the slots of the plug-side connector in accordance with the present invention.

As shown in FIG. 5, to mate plug-side connector 102 and jack-side connector 104, lugs 122 are aligned and inserted into corresponding slots 116. As shown in FIG. 5, when jack-side connector 104 is initially inserted into plug-side connector 102, lugs 122 are inserted into an initial portion 118 of slots 116. The slots 116 and lugs 122 are said to be partially engaged at this point. Next, plug-side connector 102 is pushed against jack-side connector 104 (depressing an internal spring member 306, described below, of plug-side connector 102) and bayonet sleeve 108 is rotated until lugs 122 are at the terminal portion 120 of slots 116, as shown in FIG. 6. The slots 116 and lugs 122 are said to be fully engaged at this point, because lugs 122 are now locked into position.

When plug-side connector 102 is inserted into jack-side connector 104, a leading peripheral edge 208 (see FIG. 2) of jack-side connector 104 will contact a spring element 306 (see FIG. 3A) disposed between body 106 and bayonet sleeve 108 of plug-side connector 102. Spring element 306 is a circular washer that is made from a resilient, springy material such as beryllium copper or phosphoric bronze, and is formed in a "wave-shape" such that it is not flat unless compressed by an external force and will return to its wave-shape when the external force is removed. Spring element 306 provides a bias force to secure connector assembly 100 in the locked-position when lugs 122 of jack-side connector 104 are positioned in terminal positions 120 of bayonet sleeve 108.

Visual Indication of Mating or Engagement

Bayonet sleeve 108 can include an indicator 124. Indicator 124 can be aligned with a reference point, so that when slots 116 are fully engaged with lugs 122, indicator 124 provides a visual indication that plug-side connector 102 is fully mated with jack-side connector 104. In one embodiment, sleeve 108 includes two indicators 124 positioned on sleeve 108 approximately one hundred eighty degrees apart from one another, which correspond to two slots 116.

In one example, indicator 124 is a V-shaped notch, as shown in FIGS. 1 and 4-6. In alternate examples, indicator 124 may be a dimple 700 (FIG. 7) on sleeve 108, or may be any other shape, size, or configuration, as would be known to one skilled in the relevant art. However, an advantage of the V-shaped notch is that it is easily visible from the back of plug-side connector 102. That is, referring back to FIG. 1, when plug-side connector 102 is connected to a jack-side connector 104, the V-shaped notch is clearly visible when looking toward plug-side connector 102 from a point on axis 114 to the right of plug-side connector 102. This view point is referred to herein as looking from the "back" of plug-side connector 102.

In yet other examples, indicator 124 may be a ridge 800 (FIG. 8) or lug 900 (FIG. 9) formed on sleeve 108. An advantage of a raised ridge or lug is that it would be easily visible from the back of plug-side connector 102. A raised ridge or lug may have the additional advantage of improving a user's grip for rotating sleeve 108 during connection and disconnection of mating connector pair 100.

In a further example, as shown in FIG. 3B, indication can be based on a contrast between where indicator 124 (shown in end-view looking into the opening of the V-shaped notch) is positioned and a characteristic (e.g., color, texture, etc.) of a portion 308 (e.g., washer) of the plug-side connector. In some examples, a washer may not be required and another element within plug-side connector 102 can be used for contrast against indicator 124. For example, while indicator 124 can normally be formed in bayonet sleeve 108 that is metallic or silver in color, portion 308 can be another color (e.g., black) to allow for a contrast when looking at indicator 124 against portion 308. This allows for easier determination of whether the plug-side connector is fully engaged with the jack-side connector.

In some examples, indication can be enhanced when indicator 124 is located adjacent a section 316 of bayonet sleeve 108 that has been rolled or crimped over body portion 106. This allows surface 312 to act as background for indicator 124. A color of portion 308 can be based on its material makeup (e.g., black zinc) or based on adding color (e.g., via anodizing, painting, coating, plating, etc.). Alternatively, a thin material (such as a thin paper or plastic washer) may be place against portion 308.

It is to be appreciated that although shown and discussed for a MBNC connector, the indication feature can be used for a BNC connector or any other connector system that requires full engagement for optimum functionality.

Conclusion

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

While the invention has been particularly shown and described with reference to preferred embodiments thereof, it will be understood by those skilled in the art that they have been presented by way of example only, and not limitation, and various changes in form and details can be made therein without departing from the spirit and scope of the invention. Thus, the breadth and scope of the present invention should not be limited by any of the above-described exemplary embodiments, but should be defined only in accordance with the following claims and their equivalents. Additionally, all references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

What is claimed is:

1. A coaxial plug-side connector having an average impedance of approximately 75 Ohms, comprising:

a plug-side connector body having an [outer] *inside* diameter between approximately 0.180 inches and approximately 0.195 inches;

a bayonet sleeve having an outer diameter between approximately 0.425 inches and approximately 0.484 inches and an inner diameter between approximately 0.300 inches and approximately 0.310 inches and rotatably connected to said connector body, said sleeve having only two slots therein positioned approximately 180 degrees apart from one another, each of the two slots having a width between approximately 0.061 inches and approximately 0.067 inches, for engagement with corresponding lugs on a jack-side connector;

a plug-side conductor comprising a male contact pin having an outer diameter between approximately 0.026 inches and approximately 0.032 inches that is disposed within a lumen of said plug-side connector body, said plug-side conductor being configured for mating with a jack-side conductor of said jack-side connector; and a plug-side connector insulator disposed within said plug-side connector body to electrically isolate said plug-side conductor from said plug-side connector body.

2. The plug-side connector of claim 1, wherein said outer diameter of said bayonet sleeve is between approximately 0.430 inches and approximately 0.445 inches and the inner diameter of the bayonet sleeve is between approximately 0.303 inches and approximately 0.307 inches.

3. The plug-side connector of claim 1, wherein the outer diameter of said bayonet sleeve is approximately 0.437 inches and the inner diameter of the bayonet sleeve is approximately 0.305 inches.

4. The plug-side connector of claim 1, wherein said plug-side connector insulator is formed of polytetrafluoroethylene.

5. The plug-side connector of claim 1, wherein said plug-side connector insulator has an outer diameter between approximately 0.157 inches and approximately 0.163 inches.

6. The plug-side connector of claim 1, further comprising a visual indication system that indicates when said slots in said sleeve are fully engaged with lugs of a jack-side connector.

7. The plug-side connector of claim 1, wherein each of said two slots in said sleeve comprises a J-shaped slot.

8. A jack-side connector configured for engagement with a plug-side connector to form an electrical connection and having an impedance of approximately 75 ohms, comprising:

a jack-side connector body having an outer diameter between approximately 0.285 inches and approximately 0.305 inches and an inner diameter between approximately 0.237 inches and approximately 0.257 inches, and having only two lugs having a diameter between approximately 0.053 inches and approximately 0.057 inches disposed on a peripheral surface thereof, said lugs being positioned on said jack-side connector body approximately one hundred eighty degrees apart from one another and having a distance between *outermost surfaces of* the two lugs between approximately 0.345 inches and approximately 0.365 inches, a jack-side conductor comprising a female socket having an outer diameter between approximately 0.052 inches and approximately 0.058 inches, and an inner diameter between approximately 0.026 inches and approximately 0.032 inches, disposed within a lumen of said jack-side connector body, the lumen having a depth between approximately 0.177 inches and approximately 0.183 inches; and a jack-side connector insulator disposed within said jack-side connector body to electrically isolate said jack-side conductor from said jack-side connector body.

9. The jack-side connector of claim 8, wherein the outer diameter of said jack-side connector body is approximately 0.295 inches and the inner diameter is approximately 0.247 inches.

10. The jack-side connector of claim 8, wherein said jack-side connector insulator is formed of polytetrafluoroethylene.

11. The jack-side connector of claim 8, wherein said jack-side connector insulator has an outer diameter between approximately 0.189 inches and approximately 0.195 inches.

12. A mating connector pair having an average impedance of approximately 75 ohms, comprising:

(a) a jack-side connector comprising, a jack-side connector body having an outer diameter between approximately 0.285 inches and approximately 0.305 inches and an inner diameter between approximately 0.237 inches and approximately 0.257 inches, and having only two lugs having a diameter between approximately 0.053 inches and approximately 0.057 inches disposed on a peripheral surface thereof, said lugs being positioned on said jack-side connector body approximately one hundred eighty degrees apart from one another and having a distance between *outermost surfaces of* the two lugs of approximately 0.345 inches to approximately 0.365 inches, a jack-side conductor comprising a female socket having an outer diameter between approximately 0.052 inches and approximately 0.058 inches, and an inner diameter between approximately 0.026 inches and approximately 0.032 inches, disposed within a lumen of said jack-side connector body, the lumen having a depth between approximately 0.177 inches and approximately 0.183 inches; and a jack-side connector insulator disposed within said jack-side connector body to electrically isolate said jack-side conductor from said jack-side connector body; and (b) a plug-side connector comprising, a plug-side connector body having an [outer] *inside* diameter between approximately 0.180 inches and approximately 0.195 inches;

a bayonet sleeve having an outer diameter between approximately 0.425 inches and approximately 0.484 inches and an inner diameter between approximately 0.300 inches and approximately 0.310 inches and rotatably connected to said connector body, said sleeve having only two slots therein positioned approximately 180 degrees apart from one another, each of the two slots having a width between approximately 0.061 inches and approximately 0.067 inches, for engagement with corresponding lugs on a jack-side connector;

a plug-side conductor comprising a male contact pin having an outer diameter between approximately 0.026 inches and approximately 0.032 inches that is disposed within a lumen of said plug-side connector body, said plug-side conductor being configured for mating with a jack-side conductor of said jack-side connector; and a plug-side connector insulator disposed within said plug-side connector body to electrically isolate said plug-side conductor from said plug-side connector body.

13. The mating connector pair of claim 12, wherein said outer diameter of said bayonet sleeve is between approximately 0.430 inches and approximately 0.445 inches and the inner diameter of the bayonet sleeve is between approximately 0.303 inches and approximately 0.307 inches.

14. The mating connector pair of claim 12, wherein the outer diameter of said bayonet sleeve has an outer diameter of is approximately 0.437 inches and the inner diameter of the bayonet sleeve is approximately 0.305 inches.

15. The mating connector pair of claim 12, wherein said plug-side connector insulator is formed of polytetrafluoroethylene.

16. The mating connector pair of claim 12, wherein the outer diameter of said plug-side connector insulator is approximately 0.160 inches.

17. The mating connector pair of claim 12, further comprising a visual indication system that indicates when said slots in said sleeve are fully engaged with lugs of a jack-side connector.

18. The mating connector pair of claim 12, wherein each of said two slots in said sleeve comprises a J-shaped slot.

19. The mating connector pair of claim 12, wherein the outer diameter of said jack-side connector body is approximately 0.295 inches and the inner diameter is approximately 0.247 inches.

20. The mating connector pair of claim 12, wherein said jack-side connector insulator is formed of polytetrafluoroethylene.

21. The mating connector pair of claim 12, wherein the outer diameter of said jack-side connector insulator is approximately 0.192 inches.

* * * * *